United States Patent
Schmid

(10) Patent No.: US 11,813,782 B2
(45) Date of Patent: Nov. 14, 2023

(54) DEVICE FOR ENCAPSULATING OR CASTING ROTORS

(71) Applicant: Bayerische Motoren Werke Aktiengesellschaft, Munich (DE)

(72) Inventor: Peter Schmid, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 275 days.

(21) Appl. No.: 17/271,366

(22) PCT Filed: Jul. 11, 2019

(86) PCT No.: PCT/EP2019/068691
§ 371 (c)(1),
(2) Date: Feb. 25, 2021

(87) PCT Pub. No.: WO2020/043381
PCT Pub. Date: Mar. 5, 2020

(65) Prior Publication Data
US 2021/0323206 A1    Oct. 21, 2021

(30) Foreign Application Priority Data
Aug. 31, 2018 (DE) .................. 10 2018 214 823.6

(51) Int. Cl.
*B29C 45/37* (2006.01)
*B29C 45/14* (2006.01)
(Continued)

(52) U.S. Cl.
CPC ...... *B29C 45/376* (2013.01); *B29C 45/14065* (2013.01); *H02K 15/12* (2013.01); *B29L 2031/7498* (2013.01)

(58) Field of Classification Search
CPC .............. B29C 45/376; B29C 45/1459; B29C 45/14598; B29C 45/14065
See application file for complete search history.

(56) References Cited

U.S. PATENT DOCUMENTS 3,311,690 A * 3/1967 Fischer ............. B29C 45/14073
425/577
3,642,405 A    2/1972 Eggenberger et al.
(Continued)

FOREIGN PATENT DOCUMENTS

CN    1983773 A     6/2007
CN    105104868 A   11/2015
(Continued)

OTHER PUBLICATIONS

English translation of Chinese-language Office Action issued in Chinese Application No. 201980045654.7 dated Jan. 26, 2022 (ten (10) pages).
(Continued)

*Primary Examiner* — Edmund H Lee
(74) *Attorney, Agent, or Firm* — Crowell & Moring LLP

(57) ABSTRACT

A tool, in particular for encapsulating or casting rotors of electric machines, having an arrangement space which extends along a longitudinal axis and is designed to arrange and encapsulate or cast a component, wherein the arrangement space is delimited at least in sections by at least one adjusting tool, the position of which can be adjusted in such a way that a size of the arrangement space can be changed.

9 Claims, 2 Drawing Sheets

(51) Int. Cl.
*H02K 15/12* (2006.01)
*B29L 31/00* (2006.01)

(56) References Cited

U.S. PATENT DOCUMENTS

| | | | |
|---|---|---|---|
| 4,706,928 A | | 11/1987 | Hyll |
| 4,983,344 A | * | 1/1991 | Brown ............... B29C 45/1635 |
| | | | 264/328.7 |
| 6,444,065 B1 | * | 9/2002 | Reil ................... B29C 45/1635 |
| | | | 492/49 |
| 2002/0190430 A1 | | 12/2002 | Fujiwara et al. |
| 2007/0128307 A1 | | 6/2007 | Maeda et al. |
| 2008/0048361 A1 | | 2/2008 | Neubauer |
| 2018/0326636 A1 | | 11/2018 | Zschoke |
| 2020/0164556 A1 | | 5/2020 | Kirsch et al. |

FOREIGN PATENT DOCUMENTS

| | | | |
|---|---|---|---|
| CN | 105196483 A | | 12/2015 |
| CN | 105283289 A | | 1/2016 |
| DE | 36 85 689 T2 | | 1/1993 |
| DE | 19622093 | * | 12/1996 |
| DE | 102 13 798 A1 | | 10/2002 |
| DE | 10 2004 051 462 A1 | | 4/2006 |
| DE | 10 2009 060 043 A1 | | 6/2011 |
| DE | 20 2011 106 749 U1 | | 3/2012 |
| DE | 10 2015 119 235 A1 | | 5/2017 |
| DE | 10 2016 205 813 A1 | | 10/2017 |
| DE | 20 2014 011 169 U1 | | 5/2018 |
| DE | 10 2017 214 734 A1 | | 2/2019 |
| EP | 0 507 211 A2 | | 10/1992 |
| FR | 1216466 | * | 4/1996 |
| WO | WO 97/20377 A1 | | 6/1997 |

OTHER PUBLICATIONS

International Search Report (PCT/ISA/210) issued in PCT Application No. PCT/EP2019/068691 dated Oct. 25, 2019 with English translation (seven (7) pages).

German-language Written Opinion (PCT/ISA/237) issued in PCT Application No. PCT/EP2019/068691 dated Oct. 25, 2019 (seven (7) pages).

German-language Search Report issued in German Application No. 10 2018 214 823.6 dated Jan. 30, 2019 with partial English translation (12 pages).

* cited by examiner

DEVICE FOR ENCAPSULATING OR CASTING ROTORS

BACKGROUND AND SUMMARY OF THE INVENTION

The present invention relates to a mold, in particular for encapsulating or casting rotors of electric machines, a corresponding device, and a method for producing rotors of electric machines.

In order to improve the high-speed stability of rotors of electric machines, it is known in the art for the rotors to be encapsulated in plastic. For example, DE 10 2016 205 813 A1 teaches a method for producing a rotor, wherein a laminated core of a rotor wound with rotor windings is inserted into a casting mold of an injection-molding machine, so that it can be encapsulated in a plastic compound at an injection pressure of at least 500 bar. Casting molds of this kind are very expensive. This is particularly problematic when components of different sizes, in particular differently sized rotors, for example, are to be encapsulated, since a correspondingly large number of casting forms, or molds, then has to be provided.

A problem addressed by the invention is therefore that of specifying a mold, a device, and a method for producing rotors of electric machines which are characterized by a high degree of flexibility and thereby help to reduce costs.

This problem is solved by a mold, a device, and by a method according to the independent claims. Further advantages and features result from the dependent claims and the description, and the attached figures.

According to the invention, a mold, in particular for encapsulating or overmolding/casting rotors of electric machines, has an arrangement space which extends along a longitudinal axis and is designed for the arrangement and for the encapsulation or overmolding/casting of a component, wherein the arrangement space is delimited at least sectionally by at least one adjustment tool, the position of which can be changed or adjusted in such a manner that a size of the arrangement space can be set. Advantageously, it is therefore possible for the size of the arrangement space to be adapted to a size of a component to be arranged in the arrangement space, which allows differently sized components to be arranged in one and the same mold. This is made possible by the provision of the at least one adjustment tool which is formed, delimited or co-formed, as it were, when the mold is in a closed state. In this case, the adjustment tool is advantageously designed so as to be changeable in terms of its position, such that a shape and/or size of the arrangement space can be changed. In this case, the arrangement space as such is advantageously designed in such a manner that a form-fitted arrangement of the component being encapsulated/overmolded is possible. For this purpose, the arrangement space advantageously comprises one or multiple bearing surfaces for the component being encapsulated, by means of which the component can be fixed. There are no limitations in terms of the nature of the "encapsulation." According to one embodiment, the encapsulation involves an injection-molding method. Particularly preferably, the encapsulation, overmolding or casting takes place by means of a casting method, in particular preferably by means of vacuum pressure gelation. In this case, a two-component thermosetting plastic (resin and curing agent separate) is treated in a vacuum and the material mixture is moved from below into the arrangement space according to a preferred embodiment, gelated in the cavity under pressure, and cured on. The components are then annealed in a furnace. The component according to one embodiment is a copper-wound rotor or armature of a current-excited synchronous machine. The windings of rotors of this kind have a tendency to move, particularly at higher speeds. The rotor is advantageously encapsulated or overmolded with a plastic, at least sectionally or in regions, as a result of which its high-speed stability, in particular, can be improved.

According to a preferred embodiment, the component is a rotor of an electric machine, preferably, as already mentioned, a current-excited synchronous motor, wherein the at least one adjustment tool can advantageously be positioned or adjusted along the longitudinal axis or along a rotor axis. A length of the arrangement space, in particular, is therefore preferably adjustable. Advantageously, rotors of different lengths can thereby be encapsulated in an uncomplicated manner. The aforementioned bearing surfaces can be provided at the front end, for example, on the adjustment tool, among other things, and/or also circumferentially. The encapsulation/overmolding can take place at the front end and/or also on the circumference. The mold in this case is not restricted to the encapsulation/overmolding of rotors. Depending on the embodiment, stators or any other components can also be arranged in the mold for encapsulation/overmolding. The geometry of the arrangement space is then adjusted accordingly. A traveling distance of the adjustment tool is in a range of 10 to 100 mm, for example, particularly preferably in a range of approx. 30 to 70 mm, depending on the embodiment. Dimensional deviations, up and down, are possible, however.

According to one embodiment, the at least one adjustment tool has one or multiple sealing regions which are designed to seal the component or the arrangement space axially and/or radially, at least in regions. Advantageously, the at least one sealing region is oriented towards the component. Advantageously, an adjustable sealing force acts in the sealing region, which sealing force can be adjusted by means of the adjustment unit mentioned later. Advantageously, the sealing region lies directly adjacent to the component being encapsulated, so that the sealing region may also be an arrangement region or one of the bearing surfaces which are provided for axial and/or also for radial support, in particular.

According to one embodiment, the at least one adjustment tool has a receiving portion which is designed for the form-fitted receiving of a rotor shaft. The receiving portion is advantageously designed as a cylindrical portion or as a cylindrical recess which is configured, in particular, for the form-fitted arrangement of a rotor shaft, as a result of which the rotor is exactly positioned, in particular also radially in respect of the longitudinal axis.

According to one embodiment, two adjustment tools are provided opposite, viewed along the longitudinal axis.

According to a preferred embodiment, the mold comprises a cavity insert for arrangement of the component being encapsulated, wherein the cavity insert is arranged, or can be arranged, in a mold arrangement of the mold. According to a preferred embodiment, the cavity insert has a two-part design. The cavity insert is preferably two half-shell inserts which are inserted into the mold arrangement. In other words, the cavity insert advantageously forms the arrangement space, wherein the cavity insert, for its part, is arranged in the mold arrangement. According to one embodiment, the mold arrangement has an immovable first mold half and a movable second mold half, wherein the at least one adjustment tool is arranged in the first and/or second mold half according to one embodiment.

According to one embodiment, the adjustment tool can be moved into the cavity insert, or can be moved within the cavity insert. Advantageously, the adjustment tool is arranged in a form-fitted manner in the tool half/halves, wherein if the component is a rotor of an electric machine, the adjustment tool advantageously has a roughly cylindrical shape. Advantageously, the adjustment tool is designed, in particular, as a cylindrical die which can be moved into the cavity insert. A sealing region is likewise advantageously provided circumferentially on the adjustment tool designed in this way, as a result of which an arrangement space which is leak-proof on all sides is provided, even with changing sizes. According to one embodiment, the cavity insert is designed in such a manner that it has a counter-geometry opposite the adjustment tool for arrangement of the component being encapsulated/overmolded. As already mentioned, however, two adjustment tools can also be provided which can be inserted into, and removed from, the cavity insert accordingly. Further alternatively, the mold arrangement can also form an arrangement portion or arrangement region, or also a sealing region, on the front end, so that the cavity insert as a whole has a substantially hollow cylindrical shape.

As already indicated, the cavity insert advantageously comprises two half-shell inserts or two insertion elements. According to one embodiment, the cavity insert therefore comprises two insertion elements, wherein a plug-in connector can be provided for the connection and closure of the insertion elements. This allows very short mold changeover times and low maintenance expenditure.

According to one embodiment, the plug-in connector comprises a rapid-change/quick-release system or is designed as such. A quick-release system of this kind can be closed or released manually, for example, as a result of which set-up times can be kept short. According to one embodiment, the adjustment tool is operatively connected to an internal thread for positioning, the thread flanks of the internal thread being oriented transversely to the longitudinal axis. An arrangement of this kind has the advantage that the injection pressure can be absorbed by means of the thread flanks.

According to one embodiment, an adjustment unit is provided for positioning the adjustment tool, which adjustment unit has a toothed ring according to one embodiment, wherein the toothed ring encloses the internal thread. The adjustment advantageously takes place by means of the toothed ring which controls the position of the adjustment tool by means of the internal thread and advantageously absorbs the (injection) pressure. A rotational axis of the toothed ring advantageously runs along, or parallel to, the longitudinal axis of the arrangement space. The adjustment tool is arranged coaxially to the toothed ring according to one embodiment. In accordance with one embodiment, the adjustment unit comprises a spindle drive, wherein a spindle is oriented along the longitudinal axis. This allows good absorption of force and precision adjustment. Depending on the component length, in particular the rotor length, the adjustment tool travels into the mold arrangement and/or the mold insert to different depths. The adjustment unit advantageously comprises a servo-drive. The length of the arrangement space is advantageously adjusted by the servo-drive which allows rapid, force-controlled positioning. The positioning advantageously works initially in a path-controlled manner and, following a rough positioning, in a force-controlled manner, as a result of which a desired sealing pressure or a desired sealing force can be produced.

According to one embodiment, the cavity insert which, as has already been mentioned, has a two-part design according to a preferred embodiment, has a dividing plane which runs transversely, in other words perpendicularly or substantially perpendicularly, to a dividing plane of the mold arrangement. The dividing plane preferably runs in a correspondingly parallel manner to a rotor axis. This results in a highly stable mold structure. Alternatively, however, the dividing planes may also run virtually in parallel.

According to one embodiment, the cavity insert is inserted into the first mold half, wherein the first mold half is the stationary mold half. The second mold half has a movable design, for example. The injection system in this case is advantageously provided in the first mold half. In accordance with different embodiments, a plastic, such as a thermoplastic or a thermosetting plastic, is provided as the material for encapsulation/overmolding.

According to a preferred embodiment, a surface of the arrangement space is surface-treated, in particular polished and/or provided with a separating agent, for example, as a result of which the adhesion of material is avoided.

In designing the mold, standard elements are drawn on wherever possible.

The invention also relates to a device which comprises at least one mold according to the invention.

According to a preferred embodiment, the device is a device for vacuum pressure gelation. The device preferably comprises a plurality of molds, for example two, three, four or five. The molds are preferably oriented in such a manner that the traveling distances of the adjustment tools are vertically oriented. The molds are advantageously divided parallel to the vertical axis or to the longitudinal axis. A structure of this kind is, in particular, extremely compact. Two adjustment tools are advantageously provided for each mold, in particular an upper and a lower tool, wherein a first/upper adjustment tool is designed in each case as a die that can be moved into the cavity and a second/lower adjustment tool for closing and sealing the opposite side of the adjustment space. The mold itself advantageously comprises a movable nameplate in this case, which includes the one mold halves, and a stationary nameplate which includes the other mold halves. The adjustment tools are advantageously arranged, or also connected, in such a manner that they can each be moved jointly or synchronously. In this case, mold filling advantageously takes place from below.

The device preferably comprises a plurality of cavity inserts which are designed to provide arrangement spaces with different diameters. An outer contour or outer geometry of the cavity inserts is advantageously identical, as a result of which diverse cavity inserts can be arranged in one and the same mold. By moving in the adjustment tool, the length of the arrangement space can be set to a desired dimension.

The invention also relates to a method for producing rotors of electric machines including:
provision of a mold, in particular a mold according to the invention which has an arrangement space for the arrangement and encapsulation or overmolding of a component;
adjustment of a size of the arrangement space to the component being encapsulated/overmolded by moving an adjustment tool to a predefined position, wherein the adjustment tool delimits the arrangement space at least in regions;
arrangement of the component being encapsulated in the arrangement space and encapsulation or overmolding of the component.

The arrangement space is therefore advantageously individually adapted to a size of the component being encapsulated/overmolded. In particular, the arrangement space is adapted to a size of a rotor being encapsulated/overmolded, for example, in particular to a length of a rotor being encapsulated/overmolded, as a result of which a large variety of variants can be handled with one and the same mold. In particular, different laminated core lengths can be reacted to, for example. For this purpose, it is advantageously provided that the adjustment tool is moved along an axis, in particular a longitudinal axis of a component being encapsulated/overmolded, in particular of the rotor, and locked in a desired position, wherein an arrangement space is thereby created which is suitable for the encapsulation/overmolding of the respective component.

According to one embodiment, the method includes:
application of a vacuum in the arrangement space, in order to increase a filling level and possibly improve encapsulation of the component.

According to a preferred embodiment, production takes place by means of vacuum pressure gelation. In this case, the method advantageously involves one or more of the following steps:
supply of a two-component thermosetting plastic, resin and curing agent separate;
preparation of the two-component thermosetting plastic;
filling of the arrangement space with the material mixture for encapsulating or overmolding the component from below and preferably under pressure;
gelation or curing-on in the mold;
annealing of the component or components, in particular in a furnace.

The advantages and features mentioned in connection with the mold apply analogously and correspondingly to the method and the device, and vice versa.

Further advantages and features emerge from the following description of embodiments of molds with reference to the attached figures. Different features can be combined with one another in this case in the context of the invention.

DETAILED DESCRIPTION OF THE DRAWINGS

Figure 1:
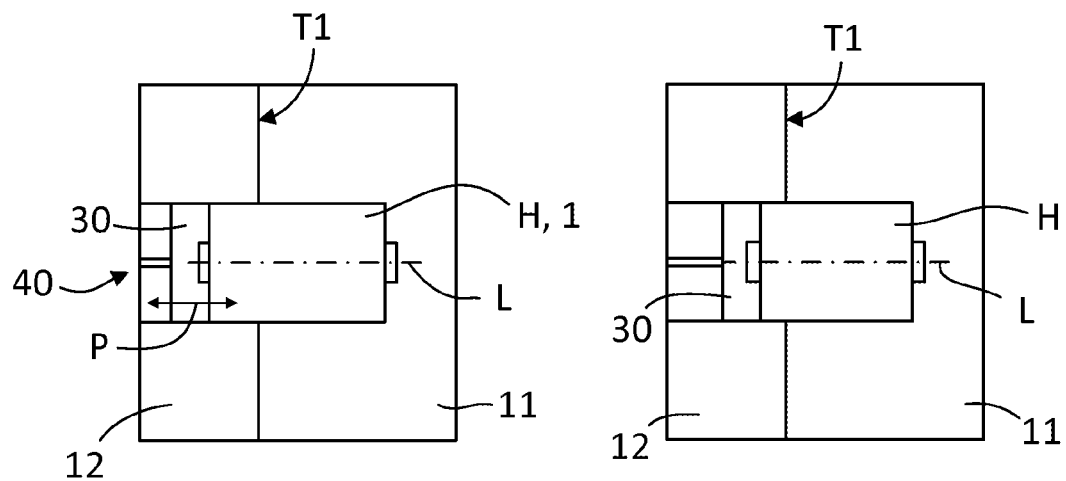
FIG. 1: shows two schematic views of an embodiment of a mold.

FIG. 1 shows in its left view a mold arrangement comprising a first mold half 11 and a second mold half 12. In conjunction with an adjustment tool 30, these form an arrangement space H in which a component 1, in particular a rotor of an electric machine, is schematically arranged. The adjustment tool is advantageously adjustable along a longitudinal axis L, wherein the longitudinal axis L corresponds to a rotor axis, this adjustability being indicated by means of a double arrow with the reference letter P. For adjustment purposes, an adjustment unit 40 which is drawn schematically is provided. This may be a spindle drive, or similar, for example. A configuration of this kind offers the advantage that a(n injection) pressure can thereby be very easily absorbed. A dividing plane T1 of the mold halves runs transversely to the longitudinal axis L. In the right half of the picture it can be seen that the adjustment tool 30 has been moved to the right, in particular by comparison with the left half of the picture, as a result of which a smaller, in particular shorter, arrangement space H is created, in which a corresponding smaller component 1, in particular a shorter rotor 1, can be arranged.

Figure 2:
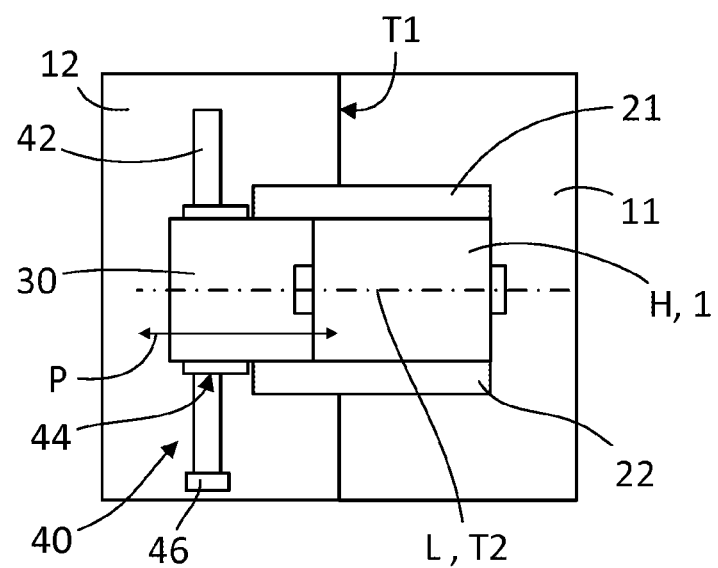
FIG. 2: shows a further view of an embodiment of a mold.

FIG. 2 shows in a further schematic representation a mold arrangement comprising a first mold half 11 and a mold half 12, wherein a cavity insert is arranged therein which has a two-part design and comprises a first insertion element 21 and a second insertion element 22. These have a dividing plane T2 which is oriented along a longitudinal axis L of an arrangement space H and perpendicularly to a dividing plane T1 of the mold arrangement comprising the two mold halves 11 and 12. Similarly to FIG. 1, an adjustment tool 30 is provided here, too, wherein an adjustment unit 40 comprises a toothed ring 42 which has an internal thread 44 that is operatively connected to the adjustment tool 30. In particular, a movement or adjustment of the adjustment tool 30 along a movement direction is possible, as represented by the double arrow P. The internal thread 44 advantageously also facilitates a very good support of an injection pressure along the longitudinal axis L. The toothed ring 42 is driven by means of a toothed wheel 46. A servo-drive is advantageously provided which is not depicted in further detail here, however.

Figure 3:
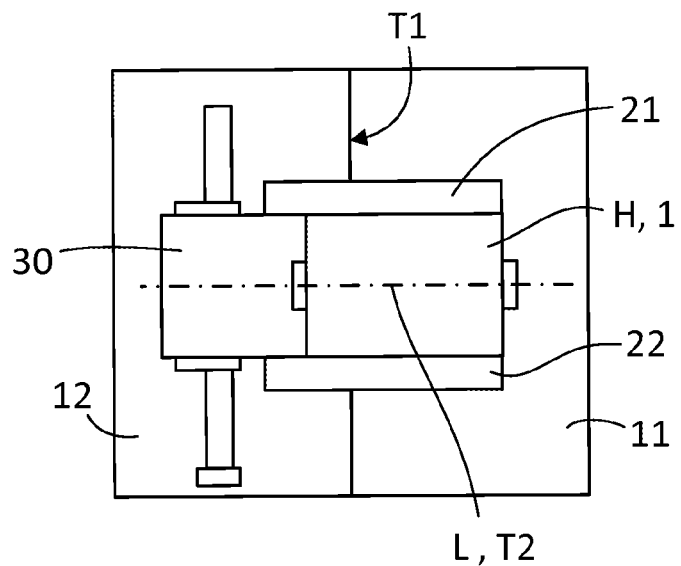
FIG. 3: shows the injection mold known from FIG. 2, wherein the mold has been moved.

FIG. 3 shows a state in which the adjustment tool 30 has been moved to the left in respect of the left half of the drawing, so that a greater, in particular longer, arrangement space H is created. Components 1, in particular rotors, are already arranged schematically in the arrangement spaces H in FIGS. 2 and 3.

Figure 4:
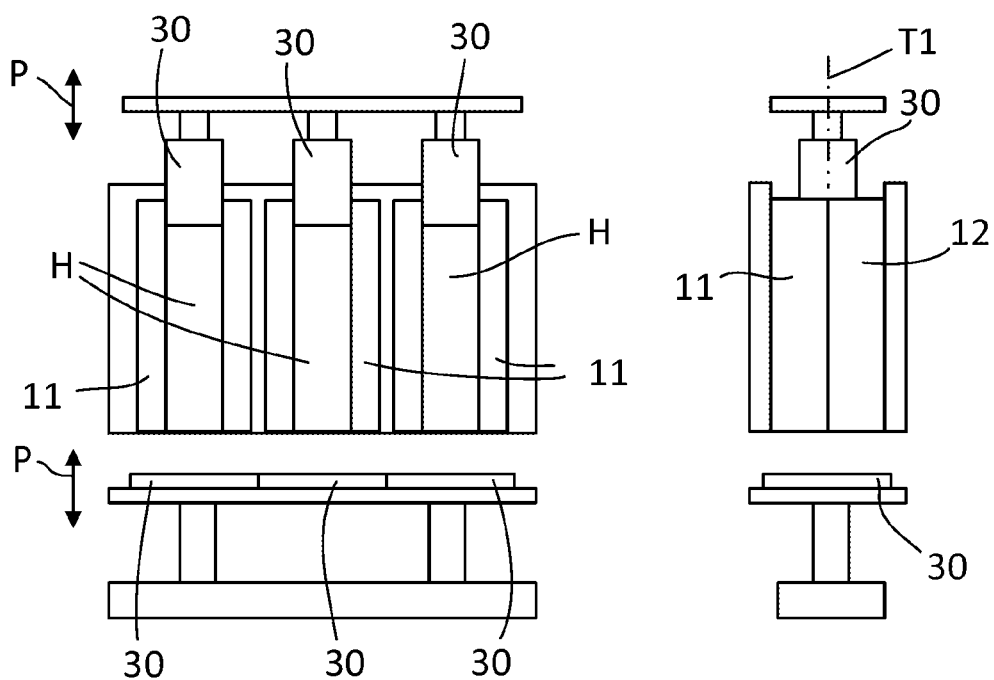
FIG. 4: shows an embodiment of a device comprising a plurality of molds.

FIG. 4 shows a device comprising three molds, wherein the right half of the image shows a side view in which the molds are closed. A first mold half 11 and a second mold half 12 can be identified. The mold half 12 is a stationary mold half, for example. Reference number T1 denotes a dividing plane of the molds, wherein this runs vertically in the present case. In particular, the mold comprises three first mold halves 11 and three second mold halves 12. This can be recognized in the left half of the image, in particular. The left half of the image shows a section through the device along the dividing plane T1, wherein the first tool halves 11 lie in the drawing plane, so to speak. Arrangement spaces H are closed or sealed on both sides by adjustment tools 30 in each case, on the top and bottom in the present case. The upper adjustment tools in this case are die-shaped in design and arranged to be moved into, and out of, the arrangement spaces H; cf. also the double arrow with the reference letter P. The lower adjustment tools 30 are used, in particular, for closing and sealing the tools, wherein these are likewise designed to be movable along the vertical axis; cf. the double arrow with the reference letter P.

LIST OF REFERENCE NUMBERS

1 component, rotor
11 first mold half
12 second mold half
21 first insertion element
22 second insertion element
30 adjustment tool
40 adjustment unit
42 toothed ring
44 internal thread
46 toothed wheel H arrangement space
L longitudinal axis
P arrow
T1 mold halves dividing plane
T2 cavity insert dividing plane

What is claimed is:

1. A mold for encapsulating or overmolding a component, comprising:
    an arrangement space which extends along a longitudinal axis and is designed for the arrangement and for the encapsulation or overmolding of the component,
    wherein the arrangement space is delimited at least sectionally by at least one adjustment tool, the position of which is adjustable in such a manner that a size of the arrangement space is changeable; and
    a cavity insert for arrangement of the component being encapsulated,
    wherein the cavity insert is arranged in a mold arrangement of the injection mold, the cavity insert comprises two insertion elements, and a plug-in connector is provided for the connection and closure of the insertion elements.

2. The mold according to claim 1, wherein the component is a rotor of an electric machine and wherein the at least one adjustment tool is positionable along the longitudinal axis.

3. The mold according to claim 1, wherein the at least one adjustment tool has a sealing region which seals the component axially, at least in regions.

4. The mold according to claim 1, wherein the at least one adjustment tool has a receiving portion which is designed for form-fitted receiving of a rotor shaft.

5. The mold according to claim 1, wherein the at least one adjustment tool is movable into the cavity insert or movable within the cavity insert.

6. The mold according to claim 1, wherein the plug-in connector comprises a quick-release system.

7. The mold according to claim 1, wherein the adjustment tool is operatively connected to an internal thread for positioning, the thread flanks of the internal thread being oriented transversely to the longitudinal axis.

8. The mold according to claim 7, wherein an adjustment unit is provided for positioning the adjustment tool, which adjustment unit has a toothed ring, wherein the toothed ring encloses the internal thread.

9. An apparatus comprising at least one mold according to claim 1.

* * * * *